US006983844B2

(12) United States Patent
O'Kane et al.

(10) Patent No.: US 6,983,844 B2
(45) Date of Patent: Jan. 10, 2006

(54) METHOD FOR TRANSPORTING A SET OF LARGE LONGITUDINAL ITEMS, A PACKAGE SYSTEM TO BE USED BY THE METHOD AND USE OF SUCH A PACKAGE SYSTEM

(75) Inventors: Roger O'Kane, Ringwood (GB); Carsten Sørensen, Århus (DK)

(73) Assignee: Neg Micon AS, Randers (DK)

( * ) Notice: Subject to any disclaimer, the term of this patent is extended or adjusted under 35 U.S.C. 154(b) by 0 days.

(21) Appl. No.: 10/475,179

(22) PCT Filed: Apr. 16, 2002

(86) PCT No.: PCT/DK02/00249

§ 371 (c)(1),
(2), (4) Date: Jun. 8, 2004

(87) PCT Pub. No.: WO02/083523

PCT Pub. Date: Oct. 24, 2002

(65) Prior Publication Data

US 2004/0217037 A1    Nov. 4, 2004

(30) Foreign Application Priority Data

Apr. 17, 2001   (GB)   .................................. 0109515

(51) Int. Cl.
*B65B 17/07*      (2006.01)
*B65D 69/00*     (2006.01)
(52) U.S. Cl. ........................ 206/443; 53/449; 206/319; 206/526; 410/32

(58) Field of Classification Search .................... 206/3, 206/319, 349, 372, 443, 521, 526, 588–594; 211/60.1; 410/32–42; 53/446, 449
See application file for complete search history.

(56) References Cited

U.S. PATENT DOCUMENTS

| 200,003 | A | * | 2/1878 | Sprowles ..................... 206/372 |
| 2,212,310 | A | * | 8/1940 | Wokosin ..................... 206/326 |
| 3,853,259 | A | * | 12/1974 | Tupper ....................... 229/103 |
| 3,861,531 | A | * | 1/1975 | Bellati ........................ 206/523 |
| 4,016,976 | A | | 4/1977 | Cosper |
| 5,628,403 | A | | 5/1997 | Thomas et al. |

FOREIGN PATENT DOCUMENTS

GB       2177375       1/1987

* cited by examiner

*Primary Examiner*—Jim Foster
(74) *Attorney, Agent, or Firm*—Harness, Dickey & Pierce PLC

(57) ABSTRACT

The invention relates to a transportation method and a package system for transporting a set of large longitudinal items such as blades for a wind turbine (1) or a tower for a wind turbine. Taking wind turbine blades (1) as an example, the advantages of the invention reside in packaging a tip (3) of one blade and a base (2) of a second blade in the one and same package (5) such that two blades (1) may be transported in packages (5, 16) having an overall lateral extension, approximately the same as the base of only one blade (1) for the wind turbine. Thereby a very compact but also a very easy means of transportation of large longitudinal items such as wind turbine blades (1) is provided.

30 Claims, 3 Drawing Sheets

Figure 1:
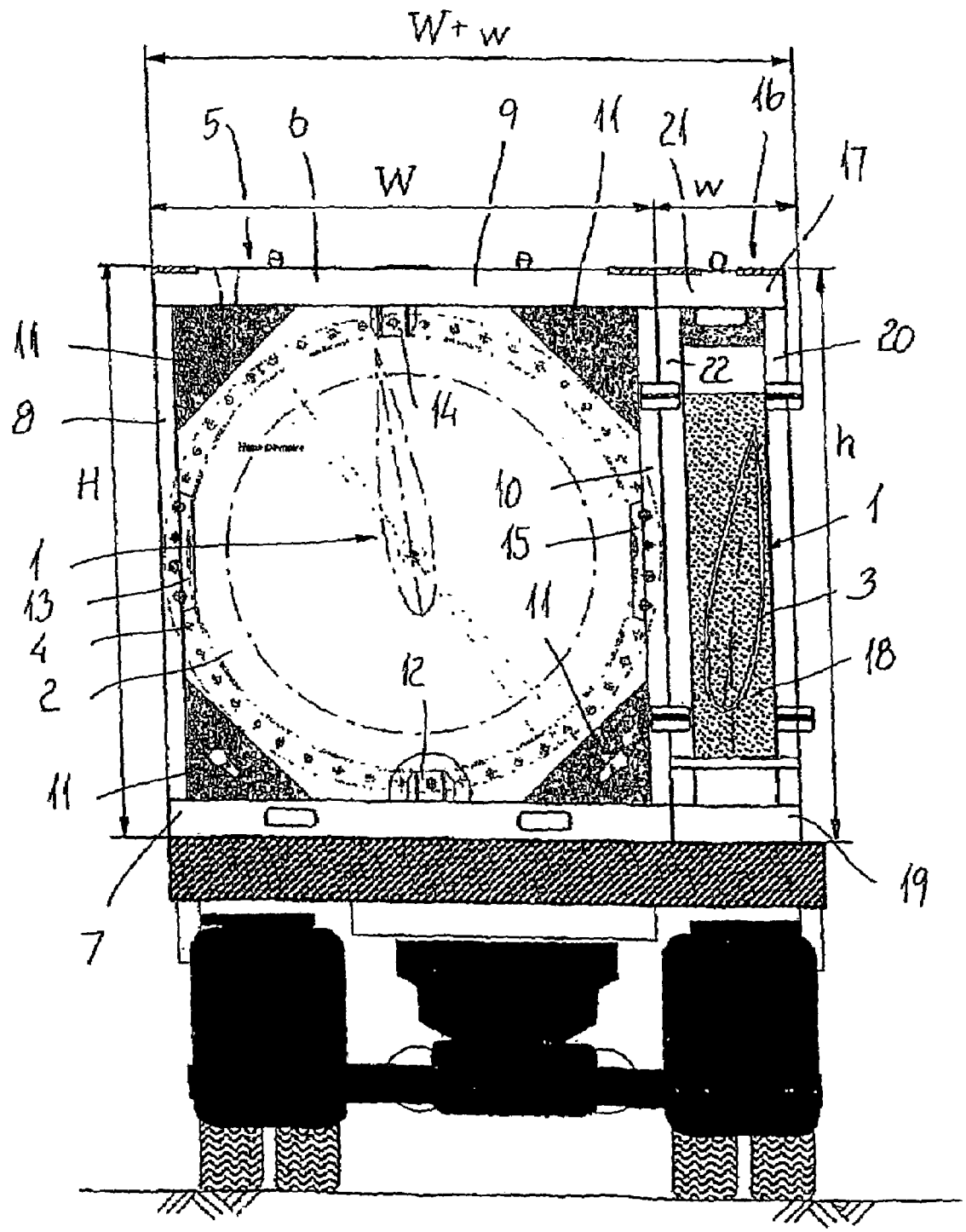

METHOD FOR TRANSPORTING A SET OF LARGE LONGITUDINAL ITEMS, A PACKAGE SYSTEM TO BE USED BY THE METHOD AND USE OF SUCH A PACKAGE SYSTEM

The present invention relates to a method for transporting a set of at least two large longitudinal items such as wind turbine blades or wind turbine towers, said items having first ends with a first circumference and second ends with a second circumference different from the first circumference. Furthermore, the invention also relates to a package system for transporting a set of at least two large longitudinal items such as wind turbine blades or wind turbine towers having a first end with a first circumference and a second end with a second and different circumference. Finally, the invention also relates to a use of a package system according to any of the preceding claims for transporting large longitudinal items.

BACKGROUND OF THE INVENTION

Transporting of large longitudinal items is often very difficult. The difficulty arises in relation to the type of transport vehicle or vessel used such as a truck, railway, a ship or an aeroplane and accordingly whether the transport must take place at land, at sea or by air. However, the difficulty also arises in relation to protecting the items to be transported against any damage that may occur due to the means of transport, i.e. by truck, by railway, by ship or by aeroplane and due to the physical element the transport takes place in, i.e. either land, sea or air.

Until now, transport of large longitudinal items such as wind turbine blades and wind turbine towers primarily takes place either by ship or by truck, alternatively by railway. Often, transport of these items takes place utilising two or more of these transportation means successively. Accordingly, during transport the items will initially be loaded from the manufacturing plant onto one kind of said transportation means. Subsequently, the items may be reloaded onto other means of transportation. This puts forward a demand for the package, which the items are transported in, to be adaptable to different kinds of transport means. Therefore, the most convenient package means will be standard containers which may be transported at least by truck, by railway and by ship without having to change from one kind of package means to another. Alternatively only one kind of transportation means will be selected, which may raise the costs of transportation.

However, it may be very difficult to support the large longitudinal item in standard containers, just because they are standard containers having standard measures and having standardised ways of containing and of supporting goods in the containers. Also, standard containers have, as mentioned, standard measures, both standard heights, standard widths and standard lengths. This prescribes standard containers certain restrictions of the size and the shape of items that may be contained in the standard containers. Accordingly, if large longitudinal items such as large wind turbine blade or tall wind turbine towers are to be transported in standard containers, it is often necessary to have the blades or towers extending between two standard containers arranged in extension of each other. This is of course a cumbersome and odd way of transporting such large longitudinal items.

Alternatively, special frames may be manufactured for a specific item for a specific transportation task. This may be wooden frames or steel frames surrounding part of or the whole of the item. Such frames will have sizes specially constructed to the specific item to be transported. After the item has been transported to the final location, the frame will have to be destroyed and disposed of. This involves problems to the final receiver of the item, a problem which may be especially noticeable in outskirts such as third world countries or the like countries or at remote locations such as at sea or in deserts where means for destroying or disposing of the frames are not available. Unfortunately, third world countries and remote areas are places where wind turbines often are placed. Also, it is a waste of package just destroying the package, but this may however be necessary.

SUMMARY OF THE INVENTION

It is an object of the present invention to provide a method which is easy to use when transporting large longitudinal items, and which does not have the limitations that standard containers or specially manufactured packages have, but which nevertheless still makes it possible to transport the items on different means of transport and reloading the items between these different means of transport with ease and without any danger of damaging the items.

This object is obtained by a method comprising packaging the first end in a first package, and packaging the second end in a second package, and said method furthermore comprising placing the first end of one item in immediate vicinity of the second end of another item, and placing the second end of the first item in immediate vicinity of a first end of the other item so that a first package of one item is placed in immediate vicinity of a second package of another neighbouring item and a second package of the one item is placed in immediate vicinity of a first package of the other neighbouring item.

in possible embodiments of the methods the first package and the second package are either placed beside each other or above and beneath each other, respectively. The invention is especially suitable for transporting wind turbine blades on trucks or by ship.

Normally a truck will only be able to transport two blades at a time, which is why the invention takes the basis in that at least just two large longitudinal items are to be transported by means of the invention.

By only packing the ends of the items in the at least two different special packages as the ones mentioned and by placing these different special packages next to each other, either beside each other or one above the other, then only the ends of the items are packed, The part of the items between the ends are not packed, However, for many large longitudinal items such as wind turbine blades or towers, this does not matter as these items are intended to be subjected to different weather conditions during their normal use, Accordingly, the weather conditions that the items may be subjected to during transport has no influence on the subsequent use of the items. For other large items, the part of the items that are not contained in the package system may be wrapped in protective coating or be packed in further package if needed in relation to preventing any damage of or dirt collecting on the surface of the items.

It is also an object to provide a package system without the disadvantages of the prior art. This object is obtained by a package system comprising a first package for packaging the first end, and said package system furthermore comprising a second package for packaging the second end, and where a first package of one item during transport and storing is placed in immediate vicinity of a second package of another neighbouring item, and where a second package of said one item during transport and storing is placed in immediate vicinity of a first package of the other neighbouring item.

Having a package system comprising two individual packages, one for each end of the large longitudinal items, makes it possible to only pack the ends of the item without having the need for a package containing the whole package. The packages of the package system will support the items in both ends and the intermediate part of the items is not supported. Also, when having two packages, one for the one end and one for the other end of neighbouring items, then it is possible to transport two items in immediate vicinity but only taking up space corresponding to a first end added with a second end of neighbouring items. This results in, that if the first end of the one item and the second end of the other item has different sizes, as example wind turbine blades where the root section of the blade has a much larger circumference than the tip of the blade, then the added space of the root section of one blade and the tip of another blade is much smaller than the added space of two root sections of blades.

In one embodiment of either or both the first package and the second package, the package consists of a rigid frame and, and where said rigid frame is designed to support the first end or the second end, of the longitudinal item and where support of the first end or the second end, of the item is provided along an inner circumference of the rigid frame. In a possible embodiment of the first package and alternatively the second package, the rigid frame of the first package, alternatively of the second package, is provided with support means within the inner circumference of the rigid frame and extending towards a centre of the rigid frame, said support means being designed for securing the first end, alternatively the second end, of the longitudinal item to the first frame by means of appropriate fastening means.

By having a frame that is rigid and having support means extending inwards from the rigid frame, the rigid frame has a rigidity that may be sufficient to protect the ends of the item from any influences during transport and the support means are intended for supporting the first end or the second end by just securing the first and or the second end to the fastening means. The support means may be rigid in order to establish a very firm securing of the first end or the second end to the rigid frame. However, the support means may also be less rigid and perhaps resilient in order to establish a kind of dampened securing of the first end or the second end to the rigid frame.

In another embodiment of either or both the first package and the second package, the package consists of a rigid outer frame and, and where said rigid frame is designed to support the first end or the second end, of the longitudinal item and where support of the first end or the second end, of the item is provided along an inner circumference of the rigid frame, and where the package is provided with an inner packing material within the inner circumference of the rigid frame and extending towards a centre of the rigid frame, said packing material being designed for supporting the second end of the longitudinal item.

By having an outer frame that is rigid and having an inner packing material extending inwards from the rigid frame, the rigid frame has a rigidity that may be sufficient to protect the ends of the item from any influences during transport and the inner packing material need not be rigid enough to sustain any possible influences during transport. Accordingly, the inner packing material may have a resilience that protects the ends of the items during transport in order to avoid any damage to the end of the items, which might occur if the ends of the items were supported by the rigid frame itself.

In a still preferred embodiment the rigid outer frame of the first package and the rigid outer frame of the second package are capable of being mutually joined so that the first package and the second package form an integrate unit, whereby the first end of the one longitudinal item is joined with the second end of the other longitudinal item.

An integrate unit consisting of a first package and a second package in each end of neighbouring items and arranged according to the invention, makes it possible to transport two items as if the two items were only one item. Thereby, the ease of transport is further enhanced, especially where at least two items are to be transported to the same location, which as example is the case with wind turbine blades, where often three blades for one wind turbine or more blades for more wind turbines are transported to the same location.

In a still preferred embodiment of the package system, the width of the first package added to the width of the second package is smaller than or has the same width as a width of a standard freight container for goods, preferably smaller than or about 8 feet, and preferably the height of the first package and the height of the second package is smaller than or has the same height as a height of a standard freight container for goods, preferably smaller than or about 8 feet or 8.6 feet.

Combing a first package and a second package so that the added space taken up by the two packages has dimensions of a standard freight container, it will be possible to transport the large longitudinal items as if the items were packed in a standard container. This has the further advantage that it will be possible easily to transport the items on different vehicles and vessels in the same way as transporting standard containers, i.e. on trucks, by railway, by ship or by aeroplane. As is the case with standard containers, it will also be possible to transport the same items in the same package system and still having the possibility of changing means of transportation by reloading the items between different means of transportation.

BRIEF DESCRIPTION OF THE INVENTION

Figure 2:
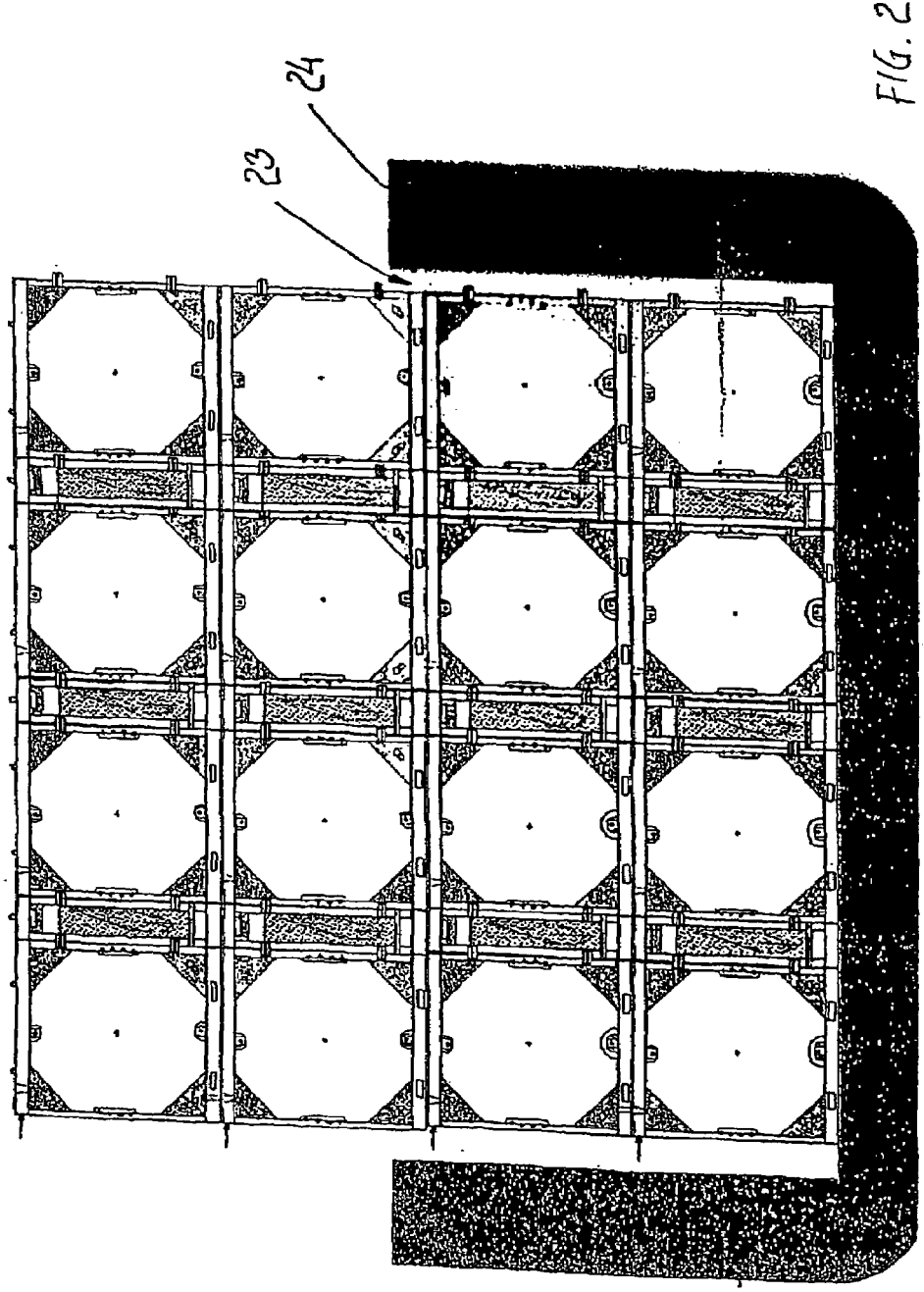
Figure 3:
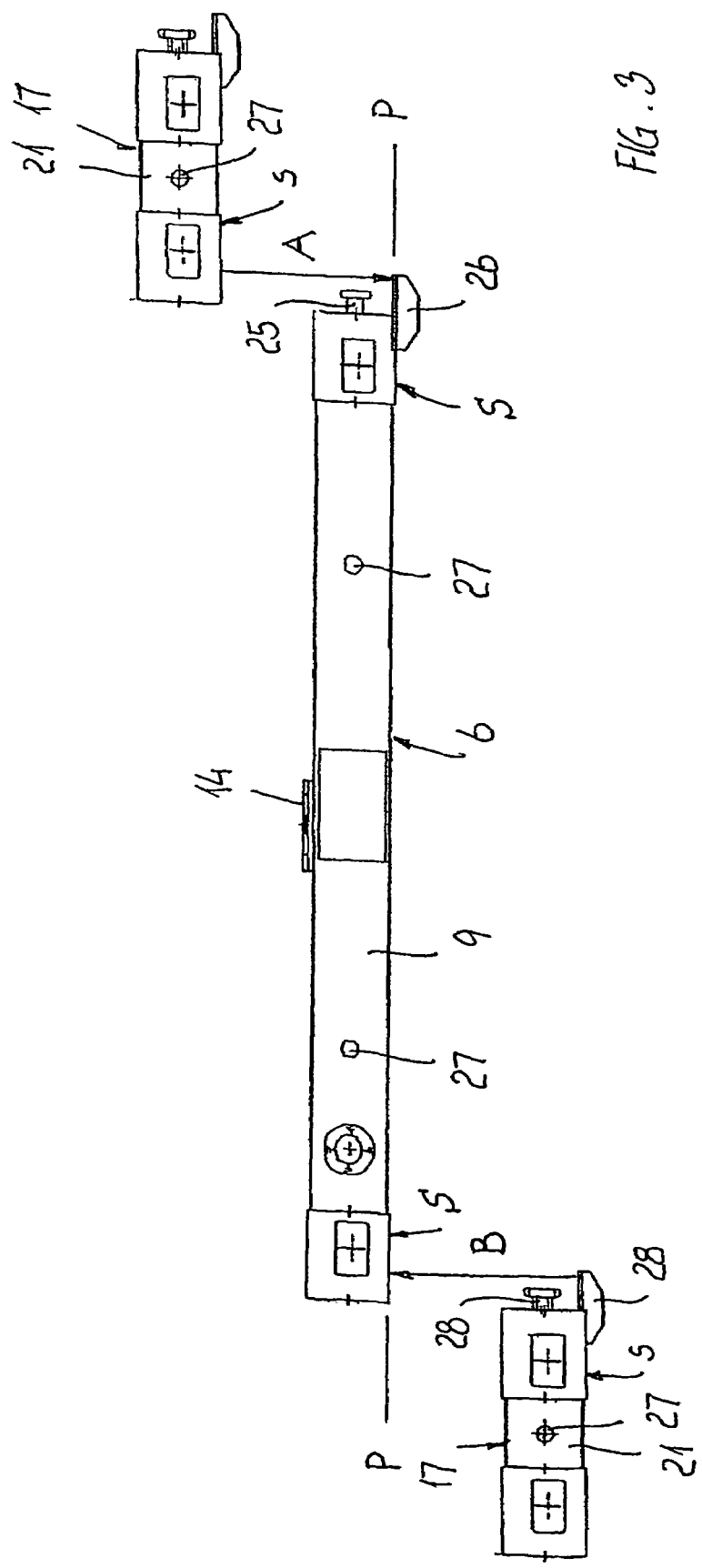

In the following the invention will be descried more in detail with reference to the accompanying drawing where, FIG. 1 shows a package system according to the invention loaded on a truck, FIG. 2 shows package systems according to invention loaded on a ship, and FIG. 3 shows parts of a package system, said parts intended for mutual joining.

DETAILED DESCRIPTION OF THE INVENTION

FIG. 1 shows from the rear of a truck a package system loaded on a platform of the truck. In the embodiment shown, the package system is used for packing two blades 1 for a wind turbine. The blades constitute large longitudinal items within the meaning of the present invention. The blades are shown in cross section, the root section 2 of the blades and the tip 3 of the blades. The root section visible constitutes a first end of the one blade and the tip visible constitutes a second end of the other blade. The root section 2 of the blades is circular with a circumference and the tip 3 of the blades is oblong with a circumference that is much smaller than the circumference of the root section. Also, the root section of the one blade has a diameter being larger than a width of the tip. From the rear of the truck the root section of one blade is visible and the tip of another blade is visible. The section root section has a number of holes 4 along the circumference of the root section. These holes are intended for bolts for securing the blade to the hub of the wind turbine when installing the wind turbine.

The root section of the one blade is packed in a first package 5. The first package is constituted by a frame 6 which is rectangular and has a width W and a height H. The frame 6 consists of four linear bars 7–10, preferably bars of steel, but other rigid materials such as plastic or wood may also be used. The corners of the frame are reinforced by plates 11, each secured to two neighbouring bars. Thereby, the rigidity of the frame is increased. The bars 7–10 are provided with means 12–15 for fastening the root section 2 of the one blade to the frame 6. The means 12–15 for fastening the root section to the frame consist of plate-like elements extending from the frame 6 towards the centre of the frame. The plate-like elements 12–15 are provided with one or more holes, said holes being placed along a circumference corresponding to the circumference of the holes 4 in the root section of the blade. By means of bolts and nuts or the like fastening means, it is possible to secure the root section 2 of the blade 1 to the plate-like elements 12–15 of the frame 6 and thus securing the first end of the blade to the frame, that constitutes the first package.

The tip 3 of the other blade is packed in a second package 16. The second package comprises an outer frame 17, which is rectangular and has a width w and a height h. The width w of the second frame 17 is smaller than the width W of the first frame 6. The height h of the second frame 17 is the same as the height H of the first frame 6. In the embodiment shown, the second package consists of the outer frame 17 and an inner packing material 18. The outer frame 17 consists of four linear bars 19–22. The inner packing material 18 is supported by an inner circumference of the outer frame. The inner packing material 18 is preferably made of a materiel being less rigid than the outer frame. The main criteria of the inner material is, that it must not damage the outer surface of the tip of the blade. Accordingly, the outer frame 17 and the inner packing material 18 may be made of the same material such as plastic or wood. However, preferably the outer frame is made of steel and the inner packing made of plastic, preferably glass fibre reinforces plastic, of wood, of foamed rubber or the like less rigid material than steel.

The first package 5 and the second package 16 are mutually joined along neighbouring sides, which in the embodiment shown is along the bars 10 and 22. The space taken up by the first package and the second package in a horizontal plane is the width W of the first package added with the width w of the second package, i.e. W+w. The space taken up in a vertical plane is the height H or h. Preferably, the added width of the first package and the second package, W+w, is smaller than or the same as a width of a standard freight container, i.e. smaller than or about 8 feet. Also, preferably the height of the first package and of the second package is smaller than or the same as a height of a standard freight (container, i.e. smaller than or about 8 feet or 8.6 feet. Thereby, when the first package and the second package are mutually joined, the packages with the one blade and the other blade may be transported as if they were a standard freight container. The mutual joining of the first package and the second package may be provided in any suitable manner.

FIG. 2 shows in cross-section of a cargo hold 23 of a ship 24 with 8 first packages and 12 second packages loaded in the cargo hold of the ship. A plurality of first packages and second packages are mutually joined in order to having the package system resemble a standard freight container and thus having the possibility of loading a plurality of package systems into the cargo hold of the ship, said cargo hold perhaps being intended for storing standard freight containers. In the embodiment shown, the package systems are also used for packing blades for a wind turbine. The blades also constitute large longitudinal items within the meaning of the present invention The suspension of the root section of the blades and of the tip of the blades take place in the same manner as described with reference to FIG. 1. Also, the mutual joining of the first package and the second package may still be provided in any suitable manner.

In the figures shown, the first package and the second package are preferably placed one beside the other. Alternatively, the first package and the second package may be placed one above the other. However, when the first package and the second package have the dimensions shown in the embodiments in order to contain the root section and the tip of a wind turbine blade placing the packages beside each other has the advantage, as mentioned, that the added width of and the height of the packages are smaller than or the same as the width and the height of standard freight containers. However, other packages for transporting large longitudinal items having other circumferences at the first end and the second end of the items may have dimensions which may result in that placing the packages above and beneath each other is more convenient. Also, other packages may have dimensions so small that it is possible to mutually join more than two packages, as example four packages consisting of two first packages and two second packages, and still having added dimensions of the mutually joined packages being smaller than or the same as the width and the height of standard freight containers.

FIG. 3 shows a possible manner of mutually joining the first package with the second package. in the figure, the upper bar 9, alternatively the lower bar 7, of the frame 6 of the first package 5 is shown and upper bars 21, alternatively lower bars 19, of the frame 17 of a second package 16 is shown detached from the bar 9 of the first package. A right side of the bar 9 of the first frame 6 is provided with a tenon 25 extending outwards from the right side of the bar 9 and having a thickness t. Correspondingly, a left side of the bar 21 of the second frame 17 is provided with a groove (not shown) extending upwards in the left side of the bar and having a width (not shown) corresponding to the thickness of the tenon 25. The bar 21 of the second frame 17 being situated at the right side of the first frame 6 is mutually joined with the bar 9 of the first frame 6 by sliding the tenon 25 at the right side of the first frame into the grove (not shown) at the left side of the second frame, or visa versa, as shown by an arrow A.

The right side of the bar 9 of the first frame 6 is furthermore provided with a stop 26 extending outwards from the right side of the bar. The stop 26 is intended as a stop when joining the bars 9,21 of the two frames 6,17, so that sides S,s of the frames lie in the same common plane P. Then, only the stop 26 extends beyond the common plane P. in the figure, the upper bars 9,21 of the frames 6,21 are shown. The top of the bars are provided with eyelets 27 intended for handling the frames when lifting and lowering the items in the frames like when lifting standard freight containers or when, in other situations, handling the frames themselves.

Similarly, a right side of a bar 21 of a an outer frame 17 of a second package is provided with a tenon 28 extending outwards from the right side of the bar and having a thickness t. Correspondingly, a left side of the bar 9 of the first frame 6 is provided with a groove (not shown) extending upwards in the left side of the bar and having a width (not shown) corresponding to the thickness of the tenon 28. The bar 9 of the first frame 6 being situated at the right side of the second frame is mutually joined with the bar 21 of the second frame 16 by sliding the tenon 28 at the right side of the second frame 17 into the groove at the left side of the first, or visa versa, as shown by an arrow B.

Also similarly, the right side of the bar 21 of the second frame 17 is furthermore provided with a stop 28 extending outwards from the right side of the bar. The stop 28 is also intended as a stop when joining the bars 9,21 of the two frames 6,17, so that the sides S,s of the frames lie in the same common plane P. Then, only the stop 28 extends beyond the common plane P.

The overall width of a frame of a first package and a frame of a second package is preferably smaller than or the same as the width of a standard freight container, i.e. smaller than or about the same as 8 feet. Also, the height of the frames of the first package and the second package is smaller than or the same as the height of a standard freight container, preferably standard 20 feet containers or 40 feet containers, i.e. smaller than or the same as 8 feet or 8.6 feet. The width of a standard 20 feet and 40 feet standard freight container is approximately 8 feet, i.e. about 2400, and the height of standard 20 feet and 40 feet standard freight containers is approximately 8 feet or 8.6 feet, i.e. between about 2400 mm and 2600 mm. The distance between the lateral planes of the frames of the packages at the first end of the one items and the second end of the other items, and between the second end of the one items and the first end of the other items, may differ depending on the length of the items to be transported. if possible, the distance is the same as the length of standard freight containers, i.e. 8 feet, 10 feet, 20 feet or 40 feet.

What is claimed is:

1. A method for transporting a set of at least two large longitudinal items such as wind turbine blades or wind turbine towers, said items having first ends with a first circumference and second ends with a second circumference different from the first circumference, said method comprising for each item packaging the first end in a first package, and for each item packaging the second end in a second package, and said method furthermore comprising placing the first end of one item in immediate vicinity of the second end of another item, and placing the second end of the first item in immediate vicinity of a first end of the other item so that a first package of one item is placed in immediate vicinity of a second package of another neighbouring item and a second package of the one item is placed in immediate vicinity of a first package of the other neighbouring item.

2. A method according to claim 1, where the at least two items are placed beside each other.

3. A method according to claim 1, where the at least two items are placed above and beneath each other, respectively.

4. A package system for transporting a set of at least two large longitudinal items such as wind turbine blades or wind turbine towers having a first end with a first circumference and a second end with a second and different circumference, said package system comprising a first package for each item packaging the first end, and said package system furthermore comprising a second package for each item packaging the second end, and where a first package of one item during transport and storing is placed in immediate vicinity of a second package of another neighbouring item, and where a second package of said one item during transport and storing is placed in immediate vicinity of a first package of the other neighbouring item.

5. A package system according to claim 4, where said first package has a longitudinal extension substantially smaller than a longitudinal extension of the item.

6. A package system according to claim 5, where said second package also has a longitudinal extension substantially smaller than the longitudinal extension of the item.

7. A package system according to claim 4, where the first package and the second package each have a rectangular cross-section when viewed in a direction parallel to the longitudinal direction of the items.

8. A package system according to claim 4, where the first package has a height H and a width W and where the second package has a height h and a width w, and where the height H is greater than or the same as the height h.

9. A package system according to claim 4, where the first package has a height H and a width W and where the second package has a height h and a width w, and where the width W is greater than or the same as the width w.

10. A package system according to claim 4, where the width W of the first package added to the width w of the second package is smaller than a width of a standard freight container for goods, preferably smaller than 8 feet.

11. A package system according to claim 4, where the width W of the first package added to the width w of the second package is equal to a width of a standard freight container for goods, preferably equal to 8 feet.

12. A package system according to claim 4, where the height of the first package and the height of the second package is smaller than a height of a standard freight container for goods, preferably smaller than 8 feet.

13. A package system according to claim 4, where the height of the first package and the height of the second package is equal to a height of a standard freight container for goods, preferably equal to 8 feet.

14. A package system according to claim 4, where the height of the first package and the height of the second package is smaller than a height of a standard freight container for goods, preferably smaller than 8.6 feet.

15. A package system according to claim 4, where the height of the first package and the height of the second package is equal to a height of a standard freight container for goods, preferably equal to 8.6 feet.

16. A package system according to claim 4, where the width W of the first package is substantially larger than the width w of the second package.

17. A package system according to claim 4, where the first package comprises a rigid frame and, and where said rigid frame is designed to support the first end of the longitudinal item and where support of the first end of the item is provided along an inner circumference of the rigid frame.

18. A package system according to claim 17, where the rigid frame of the first package is provided with support means extending within the inner circumference of the rigid frame and extending towards a centre of the rigid frame, said support means being designed for securing the first end of the longitudinal item to the first frame by means of appropriate fastening means.

19. A package system according to claim 17, where the first package is provided with an inner packing material within the inner circumference of the rigid frame and extending towards a centre of the rigid frame, said inner packing material being designed for supporting the first end of the longitudinal item.

20. A package system according to claim 18, where the support means, alternatively the inner packing material, is made of a rigid material such as metal, wood, or plastic.

21. A package system according to claim 18, where the support means, alternatively the inner packing material, is made of a resilient material such as an elastomer, foamed rubber or a fibre-based material.

22. A package system according to claim 4, where the second package comprises a rigid frame and, and where said rigid frame is designed to support the second end of the longitudinal item and where support of the second end of the item is provided along an inner circumference of the rigid frame.

23. A package system according to claim 22, where the rigid frame of the second package is provided with support means within the inner circumference of the rigid frame and extending towards a centre of the rigid frame, said support means being designed for securing the second end of the longitudinal item to the first frame by means of appropriate fastening means.

24. A package system according to claim 22, where the second package is provided with an inner packing material within the inner circumference of the rigid frame and extending towards a centre of the rigid frame, said packing material being designed for supporting the second end of the longitudinal item.

25. A package system according to claim 23, where the support means, alternatively the inner packing material, is made of a rigid material such as metal, wood, or plastic.

26. A package system according to claim 23, where the support means, alternatively the inner packing material, is made of a resilient material such as an elastomer, foamed rubber or a fibre-based material.

27. A package system according to claim 4, where the first package and the second package are capable of being mutually joined, whereby the first package and the second package form an integrate unit, and whereby the first end of the one longitudinal item is joined with the second end of the other longitudinal item.

28. A package system according to claim 27, where the first package comprises a rigid frame, said rigid frame being provided with a first part of a fastening means, where the second package comprises a rigid frame, said rigid frame being provided with a second part of the fastening means, and where the mutual joining of the first package and the second package takes place by mutually joining the first part and the second part of the fastening means.

29. A package system according to claim 28, where the first part of the fastening means consists of a tenon, where the second part of the fastening means consists of a groove, and where the mutual joining of the first package and the second package takes place by inserting the tenon into the groove.

30. A package system according to claim 27, where the first frame, alternatively the second frame, is provided with a stop extending from the frame and outwards in a vertical plane, said stop being intended as a stop for the second frame in the longitudinal direction, alternatively the first frame, when the first package and the second package are mutually joined.

* * * * *